United States Patent [19]
Lee et al.

[11] Patent Number: 5,244,937
[45] Date of Patent: Sep. 14, 1993

[54] STABLE NONAGGLOMERATING AQUEOUS SUSPENSIONS OF OIL SOLUBLE POLYMERIC FRICTION REDUCERS

[75] Inventors: Yung N. Lee; Will G. Adams, both of Ponca City, Okla.

[73] Assignee: Conoco Inc., Ponca City, Okla.

[21] Appl. No.: 793,047

[22] Filed: Nov. 15, 1991

Related U.S. Application Data

[62] Division of Ser. No. 577,976, Sep. 4, 1990, abandoned.

[51] Int. Cl.$^5$ .............................................. C08K 9/02
[52] U.S. Cl. .................................... 523/204; 524/43; 524/55; 524/570; 524/579; 524/451; 524/400; 524/430
[58] Field of Search ................... 523/204; 524/43, 55, 524/570, 579

[56] References Cited

U.S. PATENT DOCUMENTS 4,123,403 10/1978 Warner et al. ...................... 526/88
4,584,244 4/1986 Fenton ................................. 428/407

*Primary Examiner*—John C. Bleutge
*Assistant Examiner*—Mark Sweet
*Attorney, Agent, or Firm*—C. R. Schupbach

[57] ABSTRACT

Stable nonagglomerating suspensions of oil soluble polymeric friction reducers are prepared by combining free-flowing solid particles of such friction reducers with a suspension stabilizing amount of a water soluble thickening agent in water or in a mixture of water and alcohol.

4 Claims, No Drawings

STABLE NONAGGLOMERATING AQUEOUS SUSPENSIONS OF OIL SOLUBLE POLYMERIC FRICTION REDUCERS

This is a division of application Ser. No. 07/577,976 filed Sep. 4, 1990, now abandoned.

BACKGROUND OF THE INVENTION

Currently used friction reducing systems utilize a process of injecting a high molecular weight friction reducing polymer solution into conduits containing flowing hydrocarbon. The material to be injected is normally extremely viscous and difficult to handle, particularly at low temperatures. Depending upon the temperature of the flowing hydrocarbon and the concentration at which the friction reducing polymer solution is injected, significant time elapses before dissociation and resulting friction reduction occurs. In addition, complex equipment for storage, dissolving, pumping and injecting metered quantities of friction reducing material into flowing hydrocarbon is necessary.

Highly effective friction reducing polymers are described in the art. Representative samples of such art are U.S. Pat. No. 3,692,676 which teaches a method for reducing friction loss for pumpable fluids through pipelines by adding a minor amount of a high molecular weight noncrystalline polymer. U.S. Pat. No. 3,884,252 teaches the use of polymer crumb as a friction reducing material.

The use of high molecular weight polymers as friction reducers for pipelines carrying fluids under turbulent flow conditions is increasing as energy demands increase and power costs increase. Friction reduction is a phenomenon known to depend upon the high molecular weight of the polymer additive and its ability to dissolve in the hydrocarbon under turbulent flow conditions.

One drawback to the use of high molecular weight polymers for friction reduction is their very slow dissolution rate. Solid polymers of these types can take days to dissolve in some cases even though friction reduction is greatly enhanced once dissolution has occurred. This problem can be overcome to a great extent by using solutions of predissolved polymer. However, such high molecular weight polymer solutions become very viscous as the polymer content increases, thus limiting the practical application of these solutions to those containing no more than about 15 weight percent polymer. Additionally, even in this predissolved state, complete polymer dissociation in the flowing hydrocarbon can be slow. The equipment used for injection of the polymer solution can become very complicated and expensive.

Friction reducing polymers, being of high molecular weight, are solids at normal temperatures. Such polymers can be finely subdivided by grinding at very low (cryogenic) temperatures. However, the polymer solids tend to agglomerate as the polymer warms to ambient temperatures. U.S. Pat. No. 4,584,244 discloses that such agglomeration can be prevented by adding inert solids to the friction reducing polymer during the cryogenic grinding process. This patent discloses that the addition of such inert solids e.g. alumina to the grinding process provides a finely divided free flowing polymer slurry which is easily handled and provides rapid dissolution in flowing hydrocarbon oils and subsequent friction reduction.

It would be of great benefit to provide an improved method for placing free-flowing coated particles of friction reducing polymers in flowing hydrocarbon liquids and thereby reducing the friction loss of such liquids.

PRIOR ART

U.S. Pat. No. 3,290,883 to Giles, et al. relates to a drag reducing composition of viscoelastic polymers that are water soluble and have high molecular weight. The drag reducing material is premixed with water to hydrolyze it prior to its injection in the main stream pipeline.

U.S. Pat. No. 3,736,288 to Stralla, et. al. relates to a dispersed drag reduction formulation containing (1) a water soluble drag reducing agent (ethylene oxide polymer, (2) an inert water-miscible organic material (alkane diol) which is non-solvent for the ethylene oxide polymer, (3) a suspending agent (silica, silica alumina, clays, etc.) which is non-reactive with the ethylene oxide polymer and the organic material and (4) a surface active agent which is compatible with the organic material and which contains a hydrophobic and a hydrophilic moiety. Various surface active agents are described in the patent. The use of the surface active agent increases the fluidity of the system and allows increased concentration of ethylene oxide polymer in the system.

U.S. Pat. No. 4,016,894 to Baldwin, et al. relates to a drag reducing composition for high pressure water stream. The composition is a slurry mixture of finely divided free flowing hygroscopic (water soluble) drag reducing powder and a colloidal size hydrophobic (water insoluble) powder. The hygroscopic powder includes guar gum, xanthan gum, hydroxyethyl cellulose, etc. and the hydrophobic agent may be an organosilicon compound.

U.S. Pat. No. 4,263,926 to Drake, et al. relates to solid friction reducing polymers. The solid particulate polymer is mixed with a suspending liquid prior to injection into the oil pipeline. Various oil soluble polymers are disclosed in the patent.

U.S. Pat. No. 4,584,244 to Fenton discloses a process in which oil soluble polymers (e.g. poly(1-decene)) are ground at cryogenic temperatures in the presence of alumina to provide finely divided flowing powders which resist reagglomeration under cold flow or compressive conditions. The patent discloses the use of such powders as drag reducers in flowing hydrocarbons.

THE INVENTION

In accordance with the invention, a stable, nonagglomerating suspension of a solid oil soluble polymeric friction reducing agent is prepared by (1) subjecting said solid friction reducing agent to cryogenic grinding in the presence of an inert solid material to provide free flowing finely subdivided polymer particles coated with said solid material and (2) combining the coated polymer particles with a suspending material selected from the group consisting of water and water alcohol mixtures and a water soluble thickening agent, whereby a stable nonagglomerating suspension of the friction reducing agent is obtained.

In one aspect, the invention relates to the stable nonagglomerating suspensions prepared in accordance with the inventive process.

DETAILED DESCRIPTION OF THE INVENTION

The stable nonagglomerating suspensions of the invention are prepared by first subjecting a solid friction reducing agent to cryogenic grinding in the presence of an inert solid material. The resulting product is a finely subdivided polymer which is coated with the inert solid material. The coated particles are free flowing, that is, they may be handled and poured in the same manner as a liquid.

The solid polymers which are used to prepare the finely subdivided coated polymer particles are obtained by polymerizing or copolymerizing monoolefins containing from about 2 to about 30 carbon atoms. More usually, the monoolefins used in the preparation of the friction reducing polymers contain from about 4 to about 20 carbon atoms.

The method of preparation of the polymeric and copolymeric friction reducers is not a part of the invention. In general, any of the several well known methods for polymerizing monoolefins may be employed. A particularly suitable method is the Ziegler process using catalyst systems comprising the combinations of a compound of a metal of groups IVb, Vb, VIb or VIII of the periodic chart of elements found on pages 392-393 of the Handbook of Chemistry and Physics, 37th Edition, with an organo metal compound of a rare earth or a metal from groups Ia, IIa and IIIb of the periodic chart of the elements. Particularly suitable catalyst systems are those comprising titanium halides and organo aluminum compounds. A typical polymerization procedure is to contact the monomeric mixture with the catalyst in a suitable, inert hydrocarbon solvent for the monomers and the catalyst in a closed reaction vessel at reduced temperatures and autogenous pressure and in a nitrogen atmosphere. Further details of the Ziegler process are set forth in U.S. Pat. No. 3,692,676.

The polymers which are used in preparing the stable suspensions of the invention generally are those of high molecular weight. The only limitation on the molecular weight is that it must be sufficient to provide effective friction reduction. In general, the effectiveness of the polymer compositions to reduce friction increases as the molecular weight increases. On the upper end of the scale, the molecular weight of the polymers used in the process of the invention is limited only by the practicability of making the polymers. The average molecular weight of the desirable polymers is usually over 100,000 and is generally in the range of about 100,000 to about 20,000,000. The average molecular weight of the polymers used in the process and compositions of the invention is preferably in the range of about 500,000 to about 10,000,000. Any inert material which is capable of forming a coating on the finally subdivided polymer particles may be used in preparing the stable suspensions, so long as such material is compatible with the final use for which the coated polymer is intended. Representative examples of suitable inert materials are talc, alumina, magnesium stearate, silica gel, polyanhydride polymers, sterically hindered alkyl phenol antioxidants and the like.

As stated, the mixture of solid polymer and inert solids is ground at cryogenic temperatures to produce finally subdivided polymer particles coated with the inert solids. As used herein, the term "cryogenic temperatures" means temperatures below the glass transition temperature of the polymer or polymers which are being subjected to grinding. For example, when the polymeric friction reducing material is a high molecular weight poly (1-decene), the cryogenic temperature is below about $-60°$ C. The temperature employed in carrying out the grinding operation, can vary depending upon the glass transition point of the particular polymer or polymers used. But such temperatures must be below the lowest glass transition point of such polymers. Any commercial grinders which are capable of producing finely subdivided particles from solids may be used in preparing the compositions of the invention. Examples of suitable grinders include impact mills, rod mills, ball mills, and the like. The particle size of the resulting polymer solids can be controlled by methods in the art such as by varying the grinding speed or by controlling the time of grinding.

Further details on the preparation of the free flowing coated particles used in the stable suspensions of the invention are presented in U.S. Pat. No. 4,584,244 which is incorporated herein by reference.

In the next step of preparing the compositions of the invention, the free flowing coated particles of polymer are suspended in water or a mixture of water and alcohol. This suspension is obtained by the use of an effective amount of a water soluble thickening agent. The formation of the suspension is aided by the use of agitation or mixing as the materials which form the suspension are combined. In general, any order or addition of the suspension components may be employed. For example, the free flowing coated polymer particles may be added to water or a mixture of water and alcohol, preferably with agitation. Next, the water soluble thickening agent is slowly added to the polymer solids-water mixture again with agitation until a stable suspension is obtained. In another procedure, the thickening agent is first combined with the water, preferably with mixing until it is dissolved. Following this, the free flowing coated polymer solids are added to the mixture of water and thickening agent with mixing until a stable suspension is obtained. In yet another method, the thickening agent may be combined with a part of the water and the free flowing polymer solids with another part of the water and the two mixtures then combined to form a stable suspensions. It is to be understood that a mixture of water and alcohol may be substituted for the water in any of the above procedures. The suspensions obtained by the described procedures are homogeneous dispersions, stable and nonagglomerating, and may be shipped over large distances while retaining these properties. The amount of coated polymer particles which is added to the water or water alcohol mixture will vary depending upon the particular polymer and the particle size of the polymer. Usually, the coated polymer will comprise between about 1 and about 50 weight percent of the polymer-water or polymer-water-alcohol mixture. More usually, the polymer concentration will be between about 10 and about 15 weight percent. The amount of thickening agent added to the system may also vary. In general, it is desirable to add only the amount which is effective to produce a stable suspension of the particular coated polymer particles. Usually, the amount of thickening agent based on the water or water-alcohol present in the suspension is between about 0.01 and about 10 weight percent and preferably between about 0.05 and about 0.20 weight percent.

Any of the commercially available water soluble polymers which act as viscofying agents or thickening agents may be used in the preparation of the stable compositions of the invention. Well known thickening agents which are available commercially include such materials as guar gum, guar gum derivatives, hydroxypropyl cellulose and other cellulose derivatives, xantham gums, poly acrylamides, and the like.

Dispersion of the polymer particles in the aqueous suspending material is facilitated by the addition of an alcohol to the system. Lower molecular weight alcohols are lighter (lower specific gravity) than water and their addition to the water provides a suspending material which is closer in density to the polymer particles. Other things being equal the nearer the density of suspending medium is to the density of the polymer the easier it is to form the stable suspension of the invention. The alcohols used in the suspending material are usually paraffinic alcohols containing from 1 to 6 carbon atoms and include such compounds as methanol, isobutanol, ethanol, pentanol, isohexanol, propanol, isopropanol and the like. The amount of alcohol employed in the suspending material may vary widely but it usually forms between about 0 and 70 weight percent of the suspending material, and more usually between about 30 and about 50 weight percent.

The stable nonagglomerating suspensions of the invention flow very easily and can be readily injected into a pipeline or conduit containing flowing hydrocarbons without any special equipment. Usually this suspension is added to the flowing hydrocarbon fluid by continuous injection by means of proportioning pumps situated at desired locations along the conduit.

The hydrocarbon fluids in which friction loss may be reduced by addition of the stable polymer suspension and subsequent dissolution of the polymer contained in the suspension include such materials as gas oils, diesel fuel, crude oils, fuel oils, asphaltic oils and the like, varying from materials with relatively low viscosity to high viscosity hydrocarbon fractions.

The amount of polymer used in carrying out friction reduction in a pipeline or conduit is usually expressed as ppm (parts by weight of polymer per million parts by weight of hydrocarbon fluid). The amount of polymer required to produce the desired friction reduction will vary depending upon the physical properties and composition of the hydrocarbon fluid. In some instances, the desired result may be obtained by the addition of 2 parts per million or less of the polymer. On the other hand, some high viscosity fluids may require as much as 1,000 parts per million or even up to 10,000 parts per million of polymer to produce the desired result. More usually, it is preferred to add the polymer to the hydrocarbon fluid in amounts of about 2 to about 500 parts per million and most preferably in amounts of about 5 to about 200 parts per million. A major limiting factor in the current use of high molecular weight friction reducing polymers is the fact that they are usually manufactured in a solution form and they are very viscous materials. Major handling problems exist because of the viscous nature of the friction reducing polymers. To inject the material into pipelines, special methods are required such as specially designed injection nozzles. The material has to form a long strand after being injected into the pipeline for effective dissolution in the flowing hydrocarbon. Studies indicate that if the material is too viscous it can not form a stable strand in high velocity lines and becomes ineffective due to dissolution problems. This limits the polymer concentration and the inherent viscosity of the polymer that can be effectively utilized. The stable solid suspensions of the invention have a number of advantages over the conventional friction reducing procedures. For example, the solid suspension flows very easily and can be injected into pipelines without any special equipment, such as special nozzles or placement of nozzles. The suspension does not have any problem in dissolving in the flowing hydrocarbons and is as effective as presently used friction reducing agents. The solid suspension of the invention can be used with much higher polymer contents up to 25 weight percent as opposed to the current limit of 7 to 10 weight percent for polymer solutions. This substantially reduces transportation costs as the shipping volume of friction reducer suspension is substantially less. The molecular weight of the polymer in the solid suspension can be substantially increased without the handling problems associated with conventional polymer solutions. With increased molecular weight, the effective performance of the friction reducing polymer can be improved over currently available commercial products. Since the suspending material for the polymer is water, there is a substantial reduction in cost of materials in the final product that is transported to the point of use. Use of the aqueous suspension material also reduces the environmental hazards inherent in transporting friction reducing polymers.

The stable solid suspensions of the invention may readily be transferred from one location to another with very low pressure drop. This makes it possible to deliver these suspensions via pipe to locations which currently are inaccessible to conventional solution of friction reducing polymers, such as subsea completions.

EXAMPLE 1

A solid poly (decene-1) friction reducing polymer was ground for three minutes in a freezer mill (SPECS freezer mill, made by Specs Industries Inc., Metuchin, N.J.) at liquid nitrogen temperature for three minutes. The polymer was ground in the presence of alumina powder. The product from the grinder was a finely divided alumina-coated polymer powder which showed no tendency to swell or agglomerate. 10 weight percent of the polymer particles and 0.1 weight percent of a water soluble polymer were added to a 50/50 mixture of water and isopropyl alcohol. The water soluble polymer used was Kelzan XCD, a zantham gum. The mixture of coated polymer particles, water soluble polymer, water and isopropyl alcohol was shaken in a shaker bath at a moderate speed for thirty minutes which provided a stable suspension of the coated polymer particles in the water-isopropyl alcohol mixture.

The solid polymer suspension prepared in the above manner was tested in a one inch loop of schedule 40 stainless steel tubing having a length of 180 feet. 111 feet of the loop was in a straight segment and 69 feet was curved for minimum shear. Diesel fuel was pumped through the loop at 12 gallons per minute using a peristaltic cavity pump. The polymer suspension was injected into the loop through a ¼ inch port using a small chemical pump at 7 ppm polymer concentration. The loop was configured for recirculation of the flowing diesel fuel through the cavity pump. The results obtained in the first passage of diesel fuel through the loop indicated a friction reduction of 22 percent. Subsequent passes of diesel fuel through the loop resulted in continuously increasing friction reduction until a maximum of 44 percent was obtained after 5 passes through the loop.

Two significant facts are indicated by Example 1. First only part of the polymer molecules dissolved in the diesel fuel during the initial injection. Second, the friction reduction kept increasing with the number of passes of the diesel fuel through the loop. These two facts indicate that the polymer was being released in the diesel fuel in a controlled manner, whereby later released polymer molecules were overcoming any shear degradation of the initially released molecules. This result can be very important in minimizing the problem of shear degradation which is always present when using friction reducing polymers.

EXAMPLE 2

Diesel fuel was circulated at 12 gpm through the flow loop of Example 1 and a solution of friction reducing homopolymer (poly-1-decene) was introduced to the loop at 7 ppm polymer concentration. The polymer solution contained 7% polymer by weight and had an inherent viscosity of 15.2. Data were obtained for several passes through the system, including the pump. The results, in terms of friction reduction, are shown in the Table.

TABLE

| Friction Reduction, % | Number of Passes |
|---|---|
| 46 | 1 |
| 28 | 2 |
| 14 | 3 |

Obtained by utilizing Cannon-Ubbelohde Four-Bulb Shear Dilution Viscometer. A solution of 1 gram per liter of toluene was used to obtain the shear rate versus inherent viscosity. The inherent viscosity is defined as the natural log of relative viscosity divided by the concentration. The relative viscosity is defined as the ratio of viscosity readings between the polymer solution and clean toluene. The four readings obtained from the viscometer are then correlated and the viscosity reading at 300 reciprocal second is calculated.

When a friction reducing polymer is introduced into a flowing oil in solution form, a major portion of the material dissolves relatively quickly. This can result in significant shear degradation particularly if the oil is passed through a pump after addition of the friction reducing polymer. This is illustrated by Example 2 in which the percent of friction reduction of polymer in solution dropped dramatically with 2 and 3 passes through the test loop (which included the cavity pump). The degradation problem posed when the polymer is introduced in solution form can be overcome only by injecting more of the polymer or by injecting the polymer at more than one location.

With controlled release of the polymer as illustrated by Example 1, it should be possible to regulate the release rate of the polymer to a point where only a single injection into a pipeline is necessary.

While certain embodiments and details have been shown for the purpose of illustrating the present invention, it will be apparent to those skilled in the art that various changes and modifications may be made herein without departing from the spirit or scope of the invention.

We claim:

1. A process for the preparation of a stable nonagglomerating suspension of a solid oil soluble polyolefin friction reducing agent obtained from the polymerization of olefins containing from 2 to about 30 carbon atoms which comprises:
   (1) subjecting said solid polyolefin friction reducing agent to grinding at cryogenic temperatures in the presence of an inert solid material to provide free flowing, finely divided polymer particles coated with said solid material, and
   (2) combining the coated polymer particles with a water soluble polymeric thickening agent and a suspending material selected from the group consisting of water and water-alcohol mixtures, whereby a stable nonagglomerating suspension of the solid friction reducing agent is obtained.

2. A process for the preparation of a stable nonagglomerating suspension of a solid oil soluble polyolefin friction reducing agent obtained from the polymerization of olefins containing from 2 to about 30 carbon atoms which comprises:
   (1) subjecting said solid polyolefin friction reducing agent to grinding at a cryogenic temperature in the presence of an inert solid material to provide free flowing finely divided polyolefin particles coated with said solid material, and
   (2) dispersing the coated polyolefin particles in a suspending material selected from the group consisting of water and water-alcohol mixtures, said suspending material containing a water soluble polymeric thickening agent whereby a stable nonagglomerating suspension of the solid friction reducing agent is obtained.

3. A process for the preparation of a stable nonagglomerating suspension of a solid oil soluble polyolefin friction reducing agent obtained from the polymerization of olefins containing from 2 to about 30 carbon atoms which comprises:
   (1) subjecting said solid polyolefin friction reducing agent to grinding at a cryogenic temperature in the presence of an inert solid material to provide free flowing finely divided polyolefin particles coated with said solid material,
   (2) dispersing the coated polyolefin particles in a suspending material selected from the group consisting of water and water-alcohol mixtures, and
   (3) adding to the dispersion of polymer particles a polymeric water soluble thickening agent, whereby a stable nonagglomerating suspension of the solid polyolefin friction reducing agent is obtained.

4. A process for the preparation of a stable nonagglomerating suspension of a solid oil soluble polyolefin friction reducing agent obtained from polymerizing olefins containing from 2 to about 30 carbon atoms which comprises:
   (1) subjecting said solid polyolefin friction reducing agent to grinding at a cryogenic temperature in the presence of an inert solid material to provide free flowing finely divided polyolefin particles coated with said solid material,
   (2) dispersing the coated polyolefin particles in a suspending material selected from the group consisting of water and water-alcohol mixtures,
   (3) combining a water soluble thickening agent with a second portion of said suspending material, and
   (4) combining the products of steps (2) and (3), whereby a stable nonagglomerating aqueous suspension of the solid polyolefin friction-reducing agent is obtained.

* * * * *